United States Patent Office 3,130,226
Patented Apr. 21, 1964

3,130,226
SULFONIC ACID HYDRAZIDES
Hugo Gutmann, Reinach, Basel-Land, and Balthasar Hegedüs, Binningen, Switzerland, assignors to Hoffmann-La Roche Inc., Nutley, N.J., a corporation of New Jersey
No Drawing. Filed Dec. 22, 1959, Ser. No. 861,206
Claims priority, application Switzerland Dec. 31, 1958
12 Claims. (Cl. 260—556)

This invention relates to sulfonic acid hydrazides, particularly to those sulfonic acid hydrazides represented by the structural formula

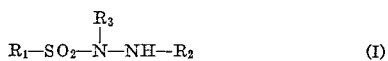

wherein $R_1$ represents lower alkyl, lower alkylphenyl, or halophenyl and $R_2$ and $R_3$ each represents hydrogen, lower alkyl containing from 2 to 7 carbon atoms or phenyl-lower alkylene, not more than one group represented by $R_2$ or $R_3$ being hydrogen.

The lower alkyl groups in the above formula are straight chain or branched chain saturated aliphatic radicals such as methyl, ethyl, propyl, isopropyl, butyl, isobutyl, t.-butyl, amyl, isoamyl, hexyl and the like. The lower alkylene groups are similar aliphatic radicals having a free bond at each terminal carbon for juncture with the nitrogen and phenyl groups, respectively.

The compounds of Formula I may be prepared by condensing a compound having the general formula

wherein X represents halogen, acyloxy, sulfonyloxy or amino and $R_1$ has the same meaning as above with hydrazine, a hydrazine producing agent or with a substituted hydrazine having the general formula

wherein $R_2$ and $R_3$ have the same meaning as in Formula I.

When $R_2$ in the condensation product represents hydrogen, the compound may be reacted with an araliphatic, or 2 to 7 carbon atom aliphatic carbonyl compound and the resulting hydrazone is then reduced. If $R_3$ represents hydrogen, the acid hydrazide, if desired, may be converted to a metal salt and treated with an agent supplying a lower alkyl, phenyl-lower alkylene group.

The reaction of a compound of Formula II with hydrazine, a hydrazine yielding agent or a compound of Formula III is preferably effected in a solvent, for example, benzene, alcohol or water. Advantageously a compound of Formula II is a substituted sulfonic acid halide, especially the chloride. The hydrogen halide formed in the reaction with hydrazine or its substitution products is preferably removed by the addition of an acid binding agent such as pyridine, sodium hydroxide, or the like. An excess of the hydrazine reactant may serve as the acid binding agent.

By using a monosubstituted hydrazine compound to react with the sulfonyl compound, there is obtained an $N^1$- or $N^2$-substituted sulfonic acid hydrazide depending on the substituents on the respective reactants. It has been found that in the presence of a branched chain substituent on the hydrazine, for example, isopropyl or 1-benzylethyl groups, the sulfonic acid group is predominantly joined with the unsubstituted nitrogen atom. By using benzylhydrazine or ethylhydrazine, however, sulfonylation occurs chiefly on the same nitrogen atom of the hydrazine where there is already a substituent attached. Inasmuch as only those hydrazine derivatives wherein the nitrogen atom containing the sulfonyl group bears an additional hydrogen atom are able to form alkali metal salts, the $N^1$- and $N^2$-substituted sulfonic acid hydrazides may readily be separated.

Those sulfonyl hydrazides unsubstituted on the second nitrogen atom may be converted with a carbonyl compound, preferably in an inert organic solvent such as ethanol or benzene, to form hydrazones. The intermediate hydrazones thus formed may by reduction be converted into compounds of Formula I. The reduction can be effected by treatment with lithium aluminum hydride in ether solution, with sodium- or potassium borohydride in aqueous alcohol or by hydrogenation in the presence of a catalyst, for example, palladium-carbon.

In sulfonyl hydrazides wherein $R_3$ represents hydrogen, an additional substituent may be introduced by converting the compound into a metal salt and treating with a substance providing a lower alkyl or phenyl-lower alkylene group. Conversion of the compound into its metal salt, for example an alkali metal salt, is effected by treating with sodium hydroxide, sodium ethylate, sodium hydride, potassium amide, etc. The metal compound is then treated with a reactive compound, for example, a halogenide or arylsulfonic acid ester. If $R_3$ in Formula I represents hydrogen, there is obtained by treatment with inorganic or organic bases, e.g. alkali metal or alkaline earth metal hydroxides and carbonates, such as sodium hydroxide, calcium carbonate, alkanolamines, such as ethanolamine, alkylenediamines, such as ethylenediamine, etc., the corresponding salts.

The products obtained according to this invention inhibit monoamine oxidase. They show marked antidepressant activity and increase weight in cases of cachexia. They are particularly useful in psychotherapy for treatment of depressed or disturbed states. They may be administered orally or parenterally by incorporating the hydrazine in conventional pharmaceutical dosage forms.

The following examples are illustrative of the invention without being limitative thereof. Temperatures are expressed on the centigrade scale.

*Example 1*

28 g. of p-toluenesulfonyl chloride were added portionwise to a solution of 22.2 g. of isopropyl hydrazine and 300 ml. of benzene. After 2 hours the precipitated isopropyl hydrazine hydrochloride was filtered off under suction, the benzene solution was washed three times with water, dried over sodium sulfate and concentrated in vacuo. The oily residue was triturated with ether and the crystals which formed were separated by filtering under suction. The product, 1-p-toluenesulfonyl-2-isopropyl hydrazine, was recrystallized from a small amount of toluene, M.P. 96–98°.

*Example 2*

24.4 g. of benzyl hydrazine were treated with 19 g. of p-toluenesulfonyl chloride in 250 ml. of benzene as described in Example 1. The precipitate was separated by filtering under suction, benzyl hydrazine hydrochloride was removed by washing with water and the residue was crystallized from dioxane. The product, 1-p-toluenesulfonyl-1-benzyl hydrazine, melted at 125–126°.

1-p-chlorbenzenesulfonyl - 1 - benzyl hydrazine, M.P. 111–112° was prepared according to the same procedure by using p-chlorbenzenesulfonyl chloride instead of p-toluenesulfonyl chloride.

*Example 3*

A solution of 30 g. of 1-benzylethyl hydrazine in 15 ml. of benzene was slowly dropped into a solution of 19 g. of p-toluenesulfonyl chloride in 55 ml. of benzene with stirring. The mixture was permitted to stand overnight. The precipitated (1-benzylethyl)-hydrazine hydrochloride was filtered under suction and the benzene layer was washed three times with water. It was then dried over sodium sulfate and concentrated in vacuo. The residue crystallized upon trituration with ice cold ether. The product, 1-p-toluenesulfonyl-2-(1-benzylethyl)-hydrazine, was recrystallized from a small amount of carbon tetrachloride, M.P. 96–98°.

*Example 4*

91 g. of p-toluenesulfonyl chloride were dissolved in 250 ml. of alcohol upon warming to 50–60°. An ice cold mixture of 65 ml. of 80% hydrazine hydrate and 100 ml. of alcohol were added portionwise. In order to prevent the reaction from proceeding too vigorously, the reaction mixture was occasionally cooled with ice water. After two hours the mixture was filtered under suction and the residue was washed with a small amount of ice cold alcohol and a large volume of water. The p-toluenesulfonic acid hydrazide thus obtained melted at 109–111°.

40 g. of p-toluenesulfonic acid hydrazide and 500 ml. of acetone were boiled under reflux for 3 hours. The mixture was permitted to crystallize in the refrigerator overnight, then filtered under suction and washed with a large amount of ether. The 1-p-toluenesulfonyl-2-isopropylidene hydrazine thus obtained melted at 159–160°.

45 g. of 1-p-toluenesulfonyl-2-isopropylidene hydrazine were dissolved in 500 ml. of dioxane and hydrogenated in the presence of 20 g. of 5% platinum black. The hydrogenation proceeded very slowly and came to a complete standstill when about 75% of the theoretical amount of hydrogen was absorbed. The catalyst was separated by filtration and the filtrate was evaporated in vacuo, whereupon a crude residue remained having an unsharp melting point of 60–90°. The crude product was purified by boiling the material with a small amount of toluene whereupon the unused starting material remained undissolved. The mixture was filtered while hot and the filtrate was cooled to 0°. Upon cooling, 1-p-toluenesulfonyl-2-isopropyl hydrazine crystallized, M.P. 96–98°.

*Example 5*

A solution of 7.6 ml. of methanesulfonyl chloride and 50 ml. of benzene were slowly dropped into a solution of 24.4 g. of benzyl hydrazine in 250 ml. of benzene with stirring. The mixture was permitted to stand overnight, then the precipitated benzyl hydrazine hydrochloride was separated by filtering under suction. The benzene solution was washed three times with water. After drying over sodium sulfate, it was concentrated in vacuo and the residue was triturated with a mixture of ether and petroleum ether (2:1). The product, 1-methanesulfonyl-1-benzyl hydrazine, was crystallized from a small amount of carbon tetrachloride, M.P. 54–57°.

*Example 6*

1-methanesulfonyl - 2 - (1-benzylethyl)-hydrazine, M.P. 108–109°, was prepared according to the procedure described in Example 5 by using 30 g. of (1-benzylethyl)-hydrazine instead of benzyl hydrazine.

We claim:

1. A compound of the formula

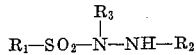

wherein $R_1$ represents a member of the group consisting of lower alkyl, lower alkylphenyl, and halophenyl and $R_2$ and $R_3$ each represents a member of the group consisting of hydrogen, isopropyl and phenyl-lower alkylene, at least one of said radicals $R_2$ and $R_3$ being other than hydrogen.

2. 1-(lower alkylphenyl)-sulfonyl-2 - phenyl-lower alkylene hydrazine.

3. 1-(lower alkylphenyl)-sulfonyl-1 - phenyl-lower alkylene hydrazine.

4. 1-lower alkylsulfonyl-2-phenyl-lower alkylene hydrazine.

5. 1-lower alkylsulfonyl-1-phenyl-lower alkylene hydrazine.

6. 1-p-toluenesulfonyl-2-isopropyl hydrazine.

7. 1-p-toluenesulfonyl-1-benzyl hydrazine.

8. 1-p-chlorbenzenesulfonyl-1-benzyl hydrazine.

9. 1-p-toluenesulfonyl-2-(1-benzylethyl)-hydrazine.

10. 1-methanesulfonyl-1-benzyl hydrazine.

11. 1-methanesulfonyl-2-(1-benzylethyl)-hydrazine.

12. 1-(lower alkylphenyl)-sulfonyl-2-isopropyl hydrazine.

References Cited in the file of this patent

UNITED STATES PATENTS

| | | |
|---|---|---|
| 2,424,256 | Schmidt et al. | July 22, 1947 |
| 2,593,930 | Sprung et al. | Apr. 22, 1952 |
| 2,928,875 | Martin et al. | Mar. 15, 1960 |

FOREIGN PATENTS

| | | |
|---|---|---|
| 12,872 of 1900 | Great Britain | Aug. 18, 1900 |
| 821,423 | Germany | Nov. 19, 1951 |

OTHER REFERENCES

Dorow et al.: Angew. Chem., vol. 67, pages 209–10 (1955).

Beilstein: Handbuch der Org. Chem., vol. 15, pages 413–414 (1932).

Beilstein: Handbuch der Org. Chem., vol. 15, 2nd supp., page 148 (1951).

Geigy: Patentanmeldung G17,239, Oct. 11, 1956, 260–556, Klasse 12°, Gruppe 22.

Yale et al.: J. American Chem. Soc., vol. 75, pages 1933–1942.